US006384771B1

(12) United States Patent
Montague et al.

(10) Patent No.: US 6,384,771 B1
(45) Date of Patent: May 7, 2002

(54) AUTOMATED TARGET GENERATOR RANGE AND DOPPLER CALCULATOR

(75) Inventors: Warren J. Montague, Redondo Beach; Garin S. Bircsak, North Hollywood; John K. Keigharn, Rancho Palos Verdes; Jorge L. Barboza, Buena Park; Robert W. Erwin, Redondo Beach, all of CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/558,275

(22) Filed: Apr. 25, 2000

(51) Int. Cl.⁷ .............................. G01S 7/40; G01S 13/00
(52) U.S. Cl. ...................... 342/170; 342/165; 342/169; 342/171; 342/172; 342/195
(58) Field of Search ................................ 342/165–174, 342/195; 434/1–10

(56) References Cited

U.S. PATENT DOCUMENTS

| 4,424,038 A | * | 1/1984 | Tingleff et al. ................ 434/2 |
| 5,117,231 A | * | 5/1992 | Yaron ......................... 342/195 |
| 5,807,109 A | * | 9/1998 | Tzidon et al. ............... 434/2 X |
| 6,067,041 A | * | 5/2000 | Kaiser et al. ............... 342/171 |

* cited by examiner

Primary Examiner—Bernarr E. Gregory
(74) Attorney, Agent, or Firm—Leonard A. Alkov; Glenn H. Lenzen, Jr.

(57) ABSTRACT

An automated simulator for radar and sonar applications. The inventive simulator is implemented in hardware and generates current parameters with respect to a simulated target in response to a plurality of initial values with respect thereto. In the illustrative embodiment, the initial values include range, velocity, and acceleration and are stored in first, second and third register respectively. In the best mode, the invention is implemented in a field-programmable gate array. The inventive target simulator also includes a range delay circuit for generating a simulated return from the simulated target. The range delay circuit includes logic for determining whether a simulated pulse train to be received is ambiguous or unambiguous and adjusting the pulse repetition rate of the pulse train accordingly. The range delay circuit calculates die initial time that a packet needs to make the trip to and from the target. Then, in the ambiguous case, the circuit only calculates how long it takes between pulses to arrive rather than the entire round trip. When the round trip distance and the ambiguous time are identical, the range delay circuit calculates both ambiguous and unambiguous signals and signals the return of whichever type arrives first. After the initial rate is calculated then the shortest calculation between the ambiguous and unambiguous pulses determine the timing for the next returned pulse.

24 Claims, 12 Drawing Sheets

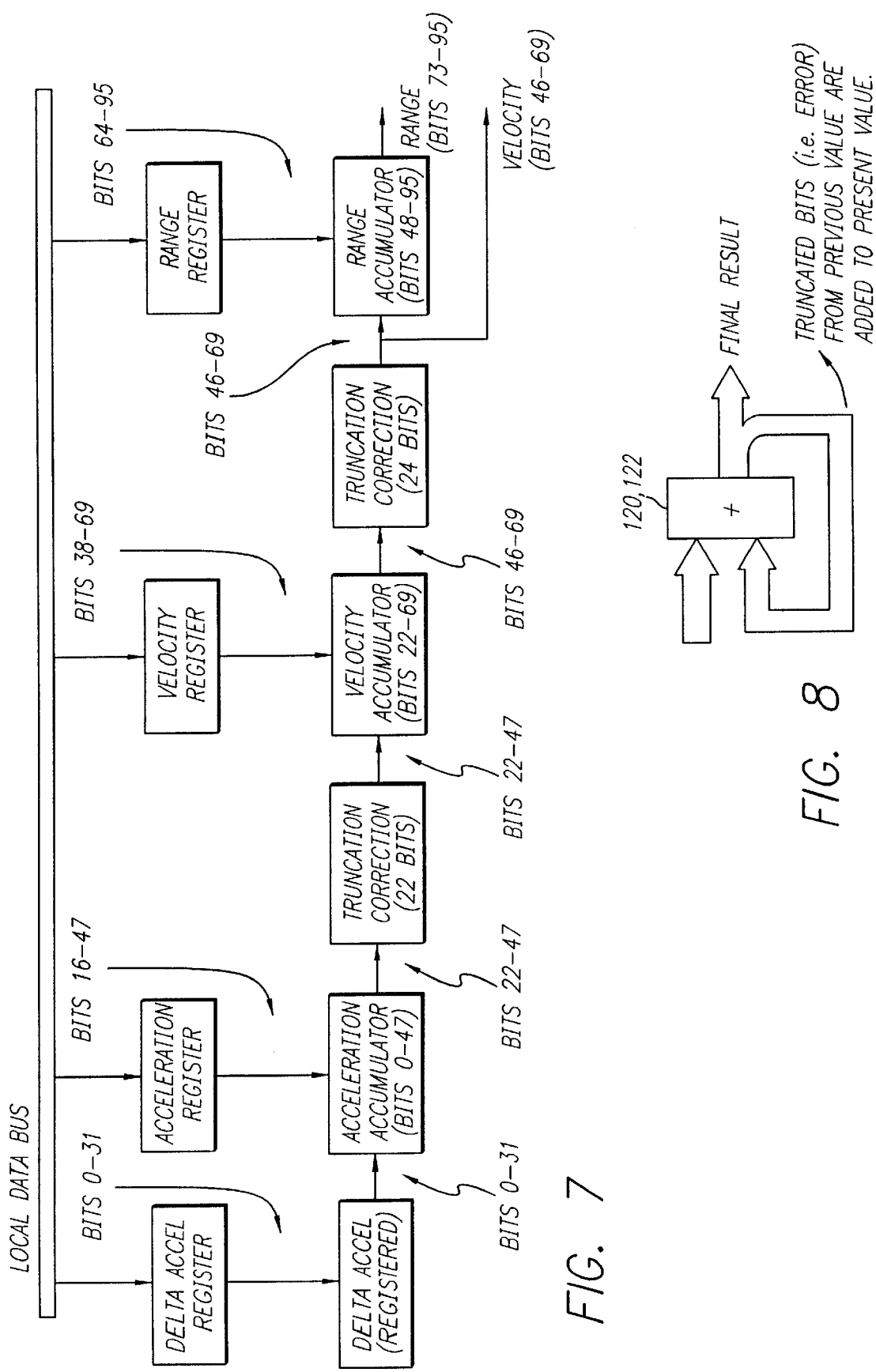

AUTOMATED TARGET GENERATOR RANGE AND DOPPLER CALCULATOR

This invention was made with Government support under Contract F33615-92-D-1050 with the Department of the Air Force. The Government has certain rights in this invention.

BACKGROUND OF THE INVENTION

1. Field of the Invention

The present invention relates to radar and sonar systems. More specifically, the present invention relates to systems and methods for simulating targets for testing radar and sonar systems.

2. Description of the Related Art

In the radar and sonar fields, target returns are simulated to test hardware and software associated with the system. Three essential vectors must be generated in order to simulate a target: range, velocity, and acceleration. These three vectors must be stored and recalculated at a very high rate (e.g., every 4 microseconds) in order to meet today's radar and sonar requirements. This problem is multiplied by the fact that each target must be kept track of separately and with considerable accuracy (e.g., plus or minus one foot of error) over a long period of time. Previously, these calculations were performed in software.

Unfortunately, new radar and sonar modes require the calculations to be performed at the high rate for each target being simulated. With the multiple target processing capability of current systems, this presents a significant burden for software based simulation systems. Accordingly, software based systems tend to create simulated target returns which suffer from noncoherent jumps in both the time and frequency domains. Unfortunately, current radars require very coherent Doppler s changes in the simulated targets to perform synthetic aperture radar (SAR) type processing.

Hence, fast returns are required to adequately test modem high performance radar systems with respect to rapidly moving targets and smooth returns are desired to coherently and accurately model targets to avoid the creation of discrepancies in die accumulator of the system. As a result, prior simulators have had difficulty meeting the coherency and speed requirements of current systems.

In addition, current radar systems generally use a stream of pulses consisting of a large number of identical and consistently timed encoded packets. These packets can be further described as ambiguous or unambiguous in nature. For a packet to be unambiguous it must be transmitted to the target and received back from the target before the next pulse is transmitted. The pulse is said to be ambiguous if it has not been received before the next pulse is transmitted.

In many cases there are a large number of ambiguous pulses in route to and from a target. Previously each packet was time tagged and stored in FIFO memory so that each pulse could be accounted for and calculated separately. This required time tagging circuits, first-in/first-out (FIFO) memory, control circuits, and identification and comparison circuits.

Hence, one of the disadvantages of the prior approach lies in the complex and intolerant circuit design required by conventional teachings. In addition, conventional radar target simulation circuits had large bus and bandwidth requirements, zero tolerance for error, and no practical recovery mechanism short of reset.

Further, simulators designed in accordance with conventional teachings must typically be reset to recover from any data which might become skewed in the FIFO memory. This process tends to drop coherent RF pulse outputs.

In short, target simulation circuits designed in accordance with conventional teachings typically required a large number of discrete logic circuit elements, were considerably complex, offered no other usable features and presented numerous service and maintainability issues.

Hence, a need exists in the art for systems and techniques for creating fast, smooth virtual target motion in a simulated target environment without the large number of discrete logic circuit elements and complex problematic circuits required by prior designs.

SUMMARY OF THE INVENTION

The need in the art is addressed by the automated target simulator of the present invention. The inventive simulator includes a circuit for generating current parameters with respect to a simulated target in response to a plurality of initial values with respect thereto.

In the illustrative embodiment, the initial values include range, velocity, and acceleration and are stored in first, second and third registers accordingly. In the best mode, the invention is implemented in a field-programmable gate array having a first circuit responsive to the acceleration value stored in the first register for accumulating a term representing acceleration of the simulated target and providing an output with respect thereto. In the best mode, a fourth register is included for storing an acceleration correction value. The acceleration correction value is used by the first circuit in the accumulation of the acceleration term. The first circuit accumulates acceleration for a given time period by adding an acceleration value from a previous time period to the acceleration correction value.

The gate array further includes a second circuit responsive to the velocity value stored in the second register and the acceleration term for accumulating a term representing the velocity of die simulated target and providing an output with respect thereto. The second circuit accumulates velocity for a given time period by adding a velocity value for a previous time period to a product of acceleration for the previous time period and a period of time Δt.

A third circuit is included which is responsive to the range value stored in the third register and the velocity term for accumulating a term representing the range of the simulated target and providing an output with respect thereto. The third circuit accumulates range for a given time period by adding a range value from a previous time period to a product of a velocity value from the previous time period and the period of time Δt.

The inventive target simulator also includes a circuit for generating a simulated return from the simulated target. The circuit for generating a simulated return includes logic for determining whether a simulated pulse train to be received is ambiguous or unambiguous and adjusting the pulse repetition rate of the pulse train accordingly. The range delay circuit of the present invention calculates the initial time that a packet needs to make the trip to and from the target. Then, in the ambiguous case, the delay only calculates how long it takes between pulses to arrive rather than the entire round trip. When the round trip distance and the ambiguous time are identical, the circuit calculates both ambiguous and unambiguous signals and outputs the return of whichever type arrives first. After the initial rate is calculated then the shortest calculation between the ambiguous and unambiguous pulses determines the timing for the next returned pulse. There is no race condition because the termination comparisons are a logical OR circuit.

In the best mode, the adjustment in die pulse repetition rate is accomplished within a field programmable gate array. The inventive circuit further includes logic for adjusting the simulated return for simulating movement relative to the simulated target. The inventive simulator uses a simple tolerant circuit that recovers automatically and immediately and has far fewer circuit elements than conventional designs.

BRIEF DESCRIPTION OF THE DRAWINGS

FIG. 7 is a diagram, which illustrates data flow through the quick calculator circuit depicted in FIG. 6.

FIG. 8 is a diagram, which illustrates the operation of each truncation stage of the quick calculator circuit of the present invention.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
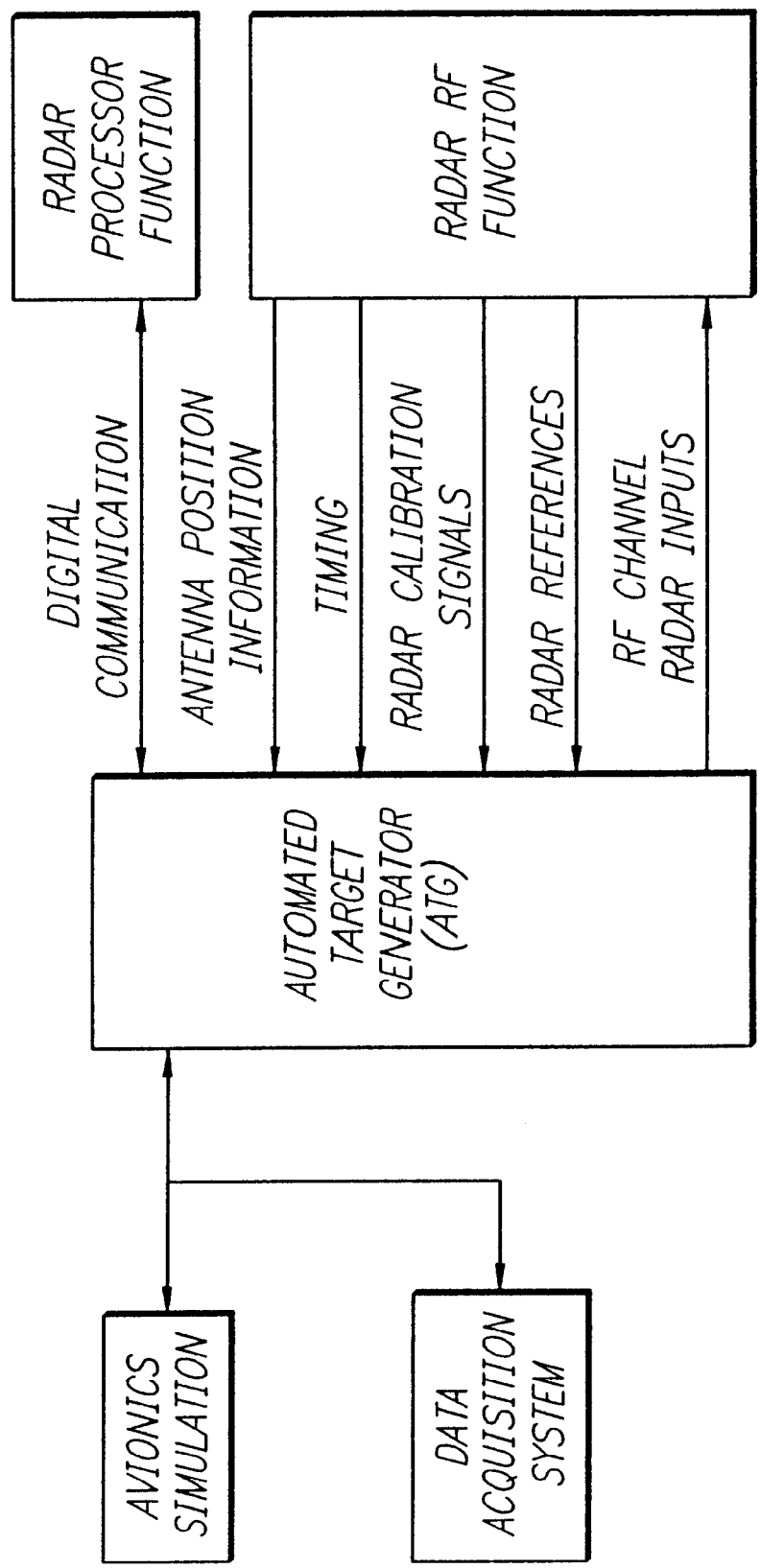
FIG. 1 is a block diagram showing an illustrative application of the automated target simulation system of the present invention.

FIG. 1 is a block diagram showing an illustrative application of the automated target simulation system of the present invention. The arrangement 1 includes an automated target generator 10 constructed in accordance with the teachings of the present invention. The target generator 10 communicates with the processor function 16 of a radar system under test. The target generator 10 uses antenna position information, timing signals, radar references, and radar calibration signals to generate a synthesized target return which is output to the radar RF function 28 or alternatively to a horn antenna array.

Avionics simulation data is exchanged with an avionics simulation processor 44. Data output by the target generator 10 is collected and analyzed by a data acquisition system 48.

Figure 2:
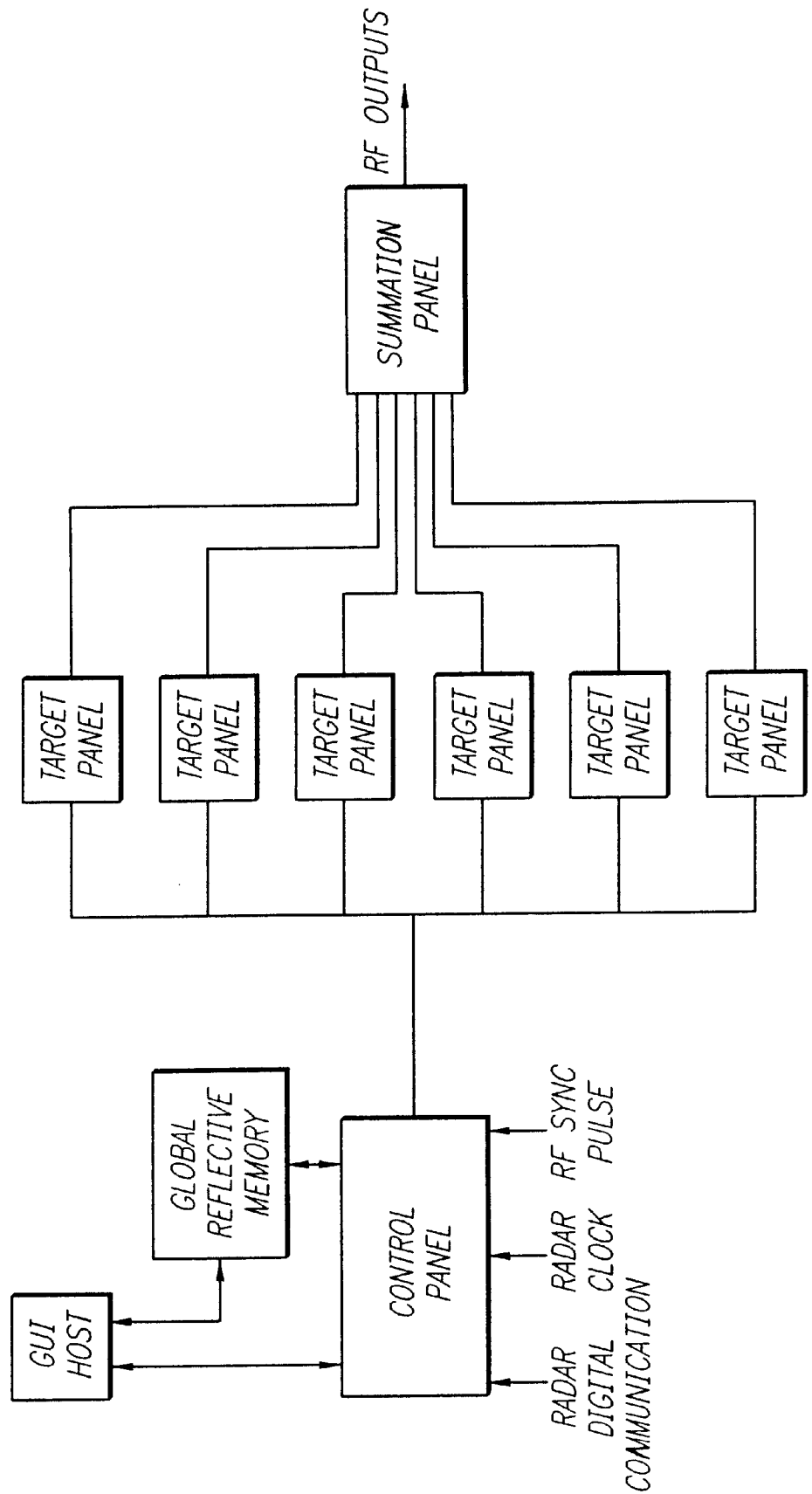
FIG. 2 is a block diagram showing an automated target generator constructed in accordance with the teachings of the present invention.

FIG. 2 is a block diagram showing an automated target generator 10 constructed in accordance with the teachings of the present invention. The target generator 10 includes a control panel 50, which receives digital communication data from the radar, a radar clock, and an RE sync pulse. The control panel outputs data to a graphic user interface host computer and a global reflective memory 54. The control panel 50 also communicates with a plurality of target panels 56–66 (even numbers only). As discussed more fully below, each target panel creates a simulated target in hardware. The outputs of the target panels are combined by a summation panel 68, which outputs simulated target RF returns.

Figure 3:
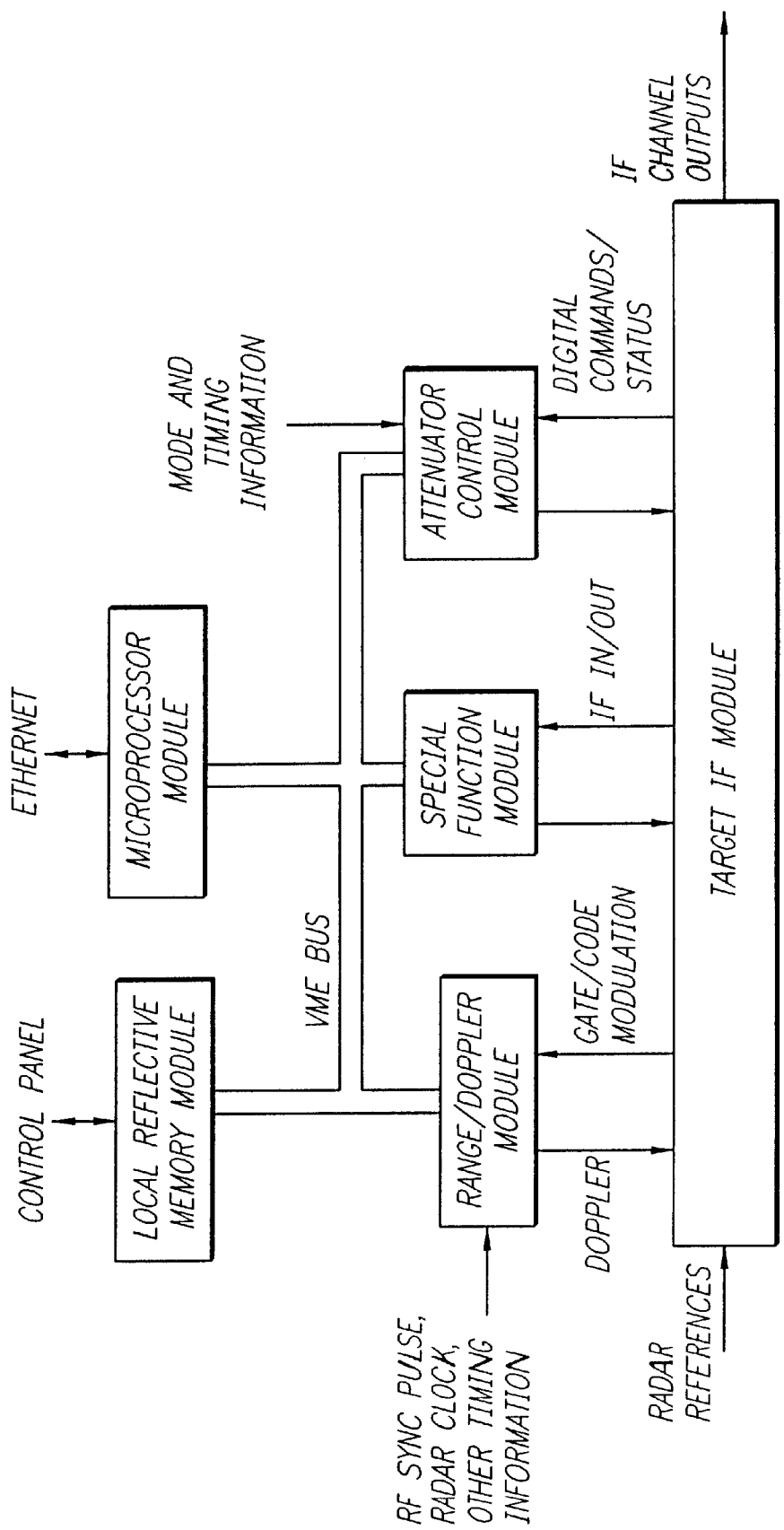
FIG. 3 is a block diagram showing an illustrative implementation of a target panel constructed in accordance with the teachings of the present invention.

FIG. 3 is a block diagram showing an illustrative implementation of a target panel constructed in accordance with the teachings of the present invention. Inasmuch as the design and construction of the target panels are identical, only one target panel 60 will be described herein. The target panel contains five modules (microprocessor module 78, local reflective memory module 76, special function module 72, attenuator control module 74, and range/doppler module 70) which communicate over a VMEbus backplane, and an intermediate frequency (F) module 69 which generates a simulated target at IF. A microprocessor module 78 provides overall panel control and processing, and communicates with external systems via an Ethernet network. Data is shared with the control panel through local reflective memory 76. The range/doppler module 70, special function module 72, and the attenuator control module 74 communicate with the target IF module 69. As described more fully, below, the range/doppler module 70 incorporates the teachings of die present invention. The range/doppler module 70 receives an RF sync pulse, radar clock pulses, and other timing information, and outputs doppler control and gate/code modulation signals to the IF module 69.

Figure 4:
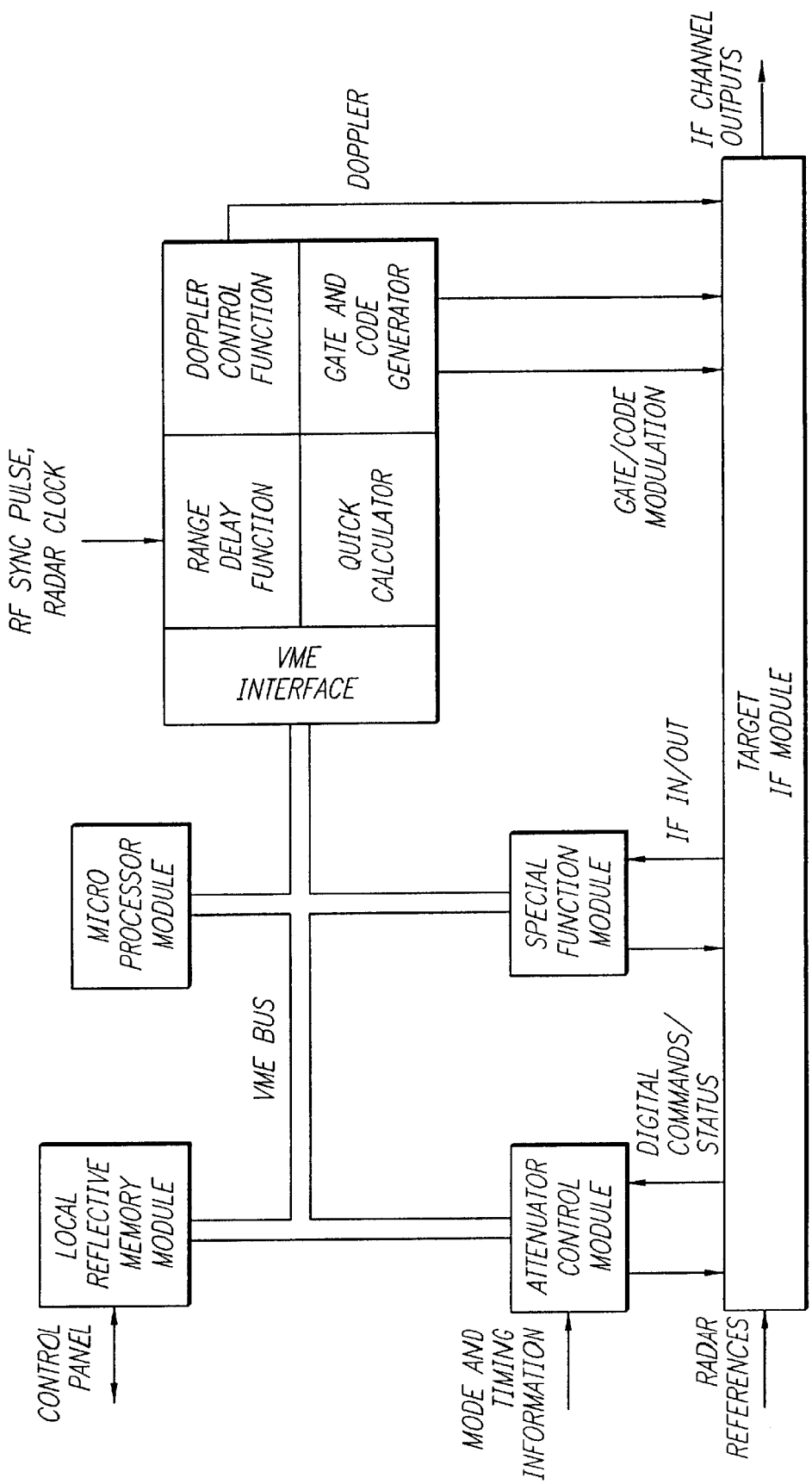
FIG. 4 is a block diagram showing an illustrative implementation of a target panel constructed in accordance with the teachings of the present invention and showing the range/doppler module in terms of the functional components thereof.

FIG. 4 is a block diagram showing an illustrative implementation of a target panel constructed in accordance with the teachings of the present invention and showing the range/doppler module in terms of the functional components thereof As discussed more fully below, the range/doppler module 70 receives input from the microprocessor 78 and various discrete signals and outputs correct pulse modulation signals at the desired range and controls doppler frequency. The range/doppler module 70 includes a VME interface 84, a quick calculator 86, a range delay subsystem 88, a doppler control function 98, and a pulse compression code generator 100.

Figure 5:
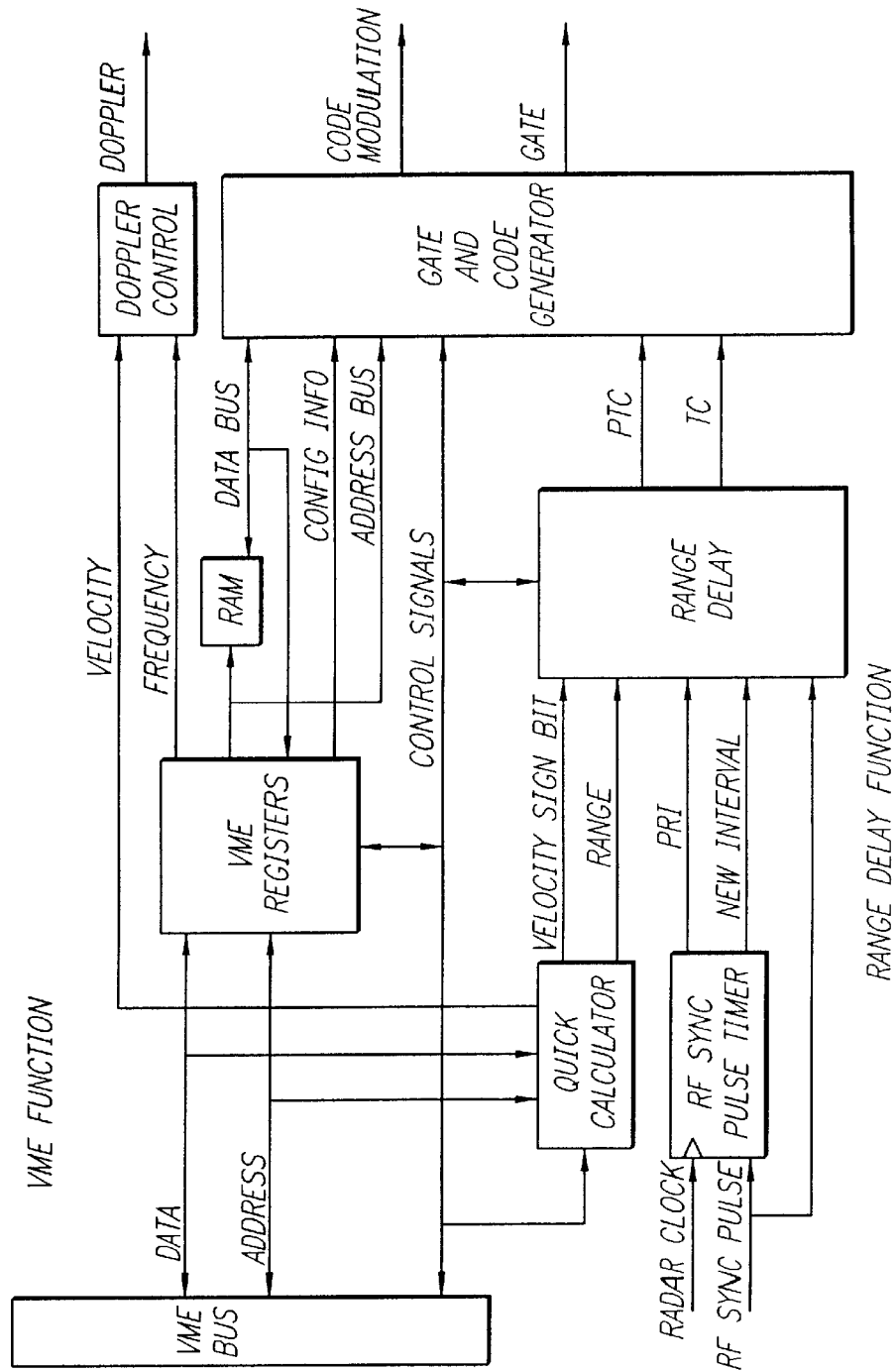
FIG. 5 is a functional block diagram of the range/doppler module in accordance with the teachings of the present invention.

FIG. 5 is a functional block diagram of the range/doppler module in accordance with the teachings of the present invention. The quick calculator circuit 86 receives initial values from the VME interface 84 and provides target range and velocity information. The range information is supplied to a range delay subsystem 88 consisting of a RF sync pulse timer circuit 89 and a range delay circuit 90.

Figure 6:
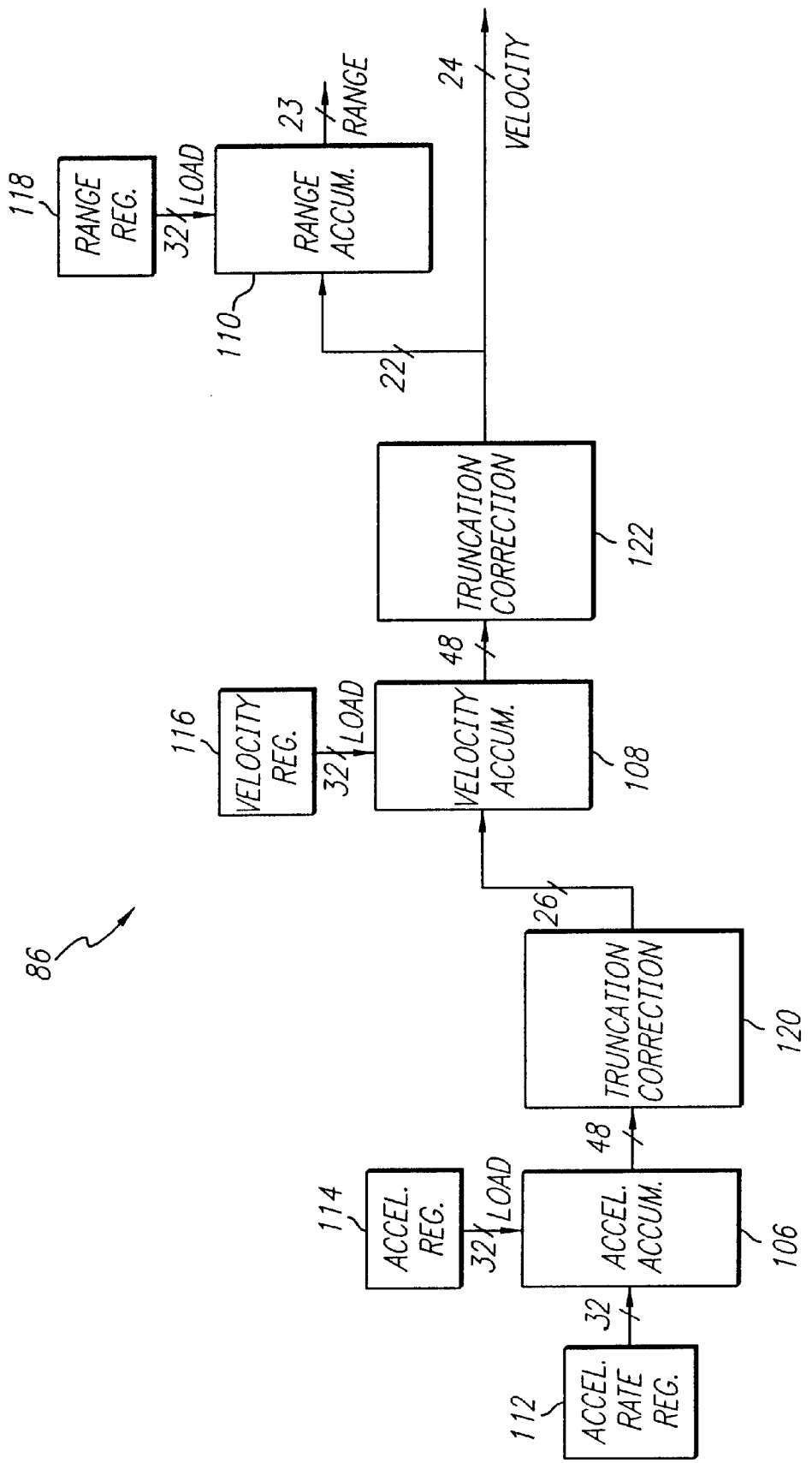
FIG. 6 is a block diagram of the quick calculator circuit of the present invention.

Quick Calculator:

FIG. 6 is a block diagram of the quick calculator circuit of the present invention. As shown in FIG. 6, the quick calculator circuit 86 generates current parameters with respect to a simulated target in response to a plurality of initial values with respect thereto. In the best mode, the quick calculator circuit 86 is implemented with a field-programmable gate array. The hardware calculation is implemented as a series of accumulators which use signed two's complement arithmetic.

The calculator 86, shown in FIG. 6, consists of three accumulators separated by two truncation correction stages. Inputs are loaded from the data bus into buffer registers. When a load command is received, the inputs initialize their respective accumulators.

In the illustrative embodiment, the initial values include range, velocity, and acceleration and are stored in first, second and third registers 114, 116 and 118, respectively. The circuit 86 has a first (acceleration) accumulator 106 responsive to an acceleration value stored in the first register 114 for accumulating a term representing acceleration of the simulated target and provides an output with respect thereto. In the best mode, a fourth register 112 is included for storing an acceleration correction value. The delta acceleration value is loaded into the fourth register 112, which provides the input to the acceleration accumulator. The acceleration correction value is used by the acceleration accumulator 106 in the accumulation of the acceleration term. The acceleration accumulator 106 accumulates acceleration for a given time period by adding an acceleration value from a previous time period to the acceleration correction value.

The quick calculator 86 further includes a second (velocity) accumulator 108 responsive to the velocity value stored in the second register 116 and the acceleration term for accumulating a term representing the velocity of the simulated target and provides an output with respect thereto. The velocity accumulator accumulates velocity for a given time period by adding a velocity value for a previous time period to a product of acceleration for the previous time period and a period of time $\Delta t$.

A third accumulator 110 is included which is responsive to the range value stored in the third register 118 and the velocity term for accumulating a term representing the range of the simulated target and provides an output with respect thereto. The range accumulator accumulates range for a given time period by adding a range value from a previous time period to a product of a velocity value from the previous time period and the period of time $\Delta t$.

The quick calculator is essentially performing a numerical integration. It takes into account third and fourth order terms in computing intermediate velocity and range values. The approximating equations used are shown here as:

$$\text{accelerations}_{i+1} = \text{acceleration}_i + \Delta \text{acceleration}$$

$$\text{velocity}_{i+1} = \text{velocity}_i + \text{acceleration}_i \Delta \text{time}$$

$$\text{range}_{i+1} = \text{range}_i + \text{velocity}_i \Delta \text{time}$$

Time can be normalized by expressing it in terms of calculator clock periods. $\Delta$time above becomes 1. The final range result is expressed as an integral number of system clock periods.

Acceleration Units: $t_{sys}/t_i^2$

Velocity Units: $t_{sys}/t_i$

Range Units: $t_{sys}$ where: $t_{sys}$=system clock period and $t_i$=calculator clock period.

On each clock cycle, a new value is calculated from the previous value as well as higher-order terms. Each stage of the calculation is an accumulator, which adds a term from the previous stage to its present value. Multiplications are eliminated by normalizing time units such that $\Delta$time=1. Time units are expressed in terms of the period of the clock used by the quick calculator. Range for the range delay generator s is expressed as an integral number of system clock periods.

FIG. 7 is a diagram which illustrates data flow through the quick calculator circuit depicted in FIG. 6. The bits used to represent each number are indicated in the flow diagram. They can be thought of as a subset of the bits of a 96-bit binary number, where the LSB is bit 0 and the MSB is bit 95. Each accumulator is clocked by a master clock. The two outputs—range and velocity—are updated on each clock cycle.

Values are expressed as 48-bit fixed-point numbers. Because fixed-point, as opposed to floating point, numbers are used for the hardware calculation, to perform the integrations from acceleration down to range with full accuracy would require 96-bit numbers. Each value in the chain of numerical integrations is an order of magnitude different from the preceding value. Ninety-six-bit numbers are impractical to work with in an FPGA due to speed and routability problems. Using 48-bit representations requires some truncation between stages since each successive stage of the Quick Calculator is bit-shifted slightly toward the left. Two truncation correction stages 120, 122 are provided to keep track of some of the error caused by these "lost" bits and to correct later values. The first truncation correction circuit 120 is provided between the acceleration accumulator 106 and the velocity accumulator 108. The second truncation correction circuit 122 is provided between the velocity accumulator 108 and the range accumulator 110.

FIG. 8 is a diagram, which illustrates the operation of each truncation stage of the quick calculator circuit of the present invention. As shown in FIG. 8, the truncation correction stages accumulate some or all of the bits not passed on to the next stage. The accumulated value adjusts the output up or down when its magnitude becomes large enough.

This truncation correction is particularly important for the velocity output since the DDS is limited in the number of bits used for its Doppler frequency command. The effect of the truncation correction stage is to move the commanded Doppler frequency above and below the true Doppler frequency such that the commanded average frequency equals the true value.

As an example of this correction, assume a desired value of 19.94. Assume at the last digit must be truncated when the value is commanded to the DDS. The correction would proceed as follows:

| Desired Value | Previous Error | Corrected Value | Output Value |
| --- | --- | --- | --- |
| 19.94 | 0.00 | 19.94 | 19.9 |
| 19.94 | 0.04 | 19.98 | 19.9 |
| 19.94 | 0.08 | 20.02 | 20.0 |
| 19.94 | 0.02 | 19.96 | 19.9 |
| 19.94 | 0.06 | 20.00 | 20.0 |
| 19.94 | 0.00 | 19.94 | 19.9 |
| 19.94 | 0.04 | 19.98 | 19.9 |
| etc. | | | |

Range Delay

Returning to FIG. 5, the range delay subsystem 88 includes an RF sync pulse timer circuit 89 and a range delay circuit 90.

Figure 9:
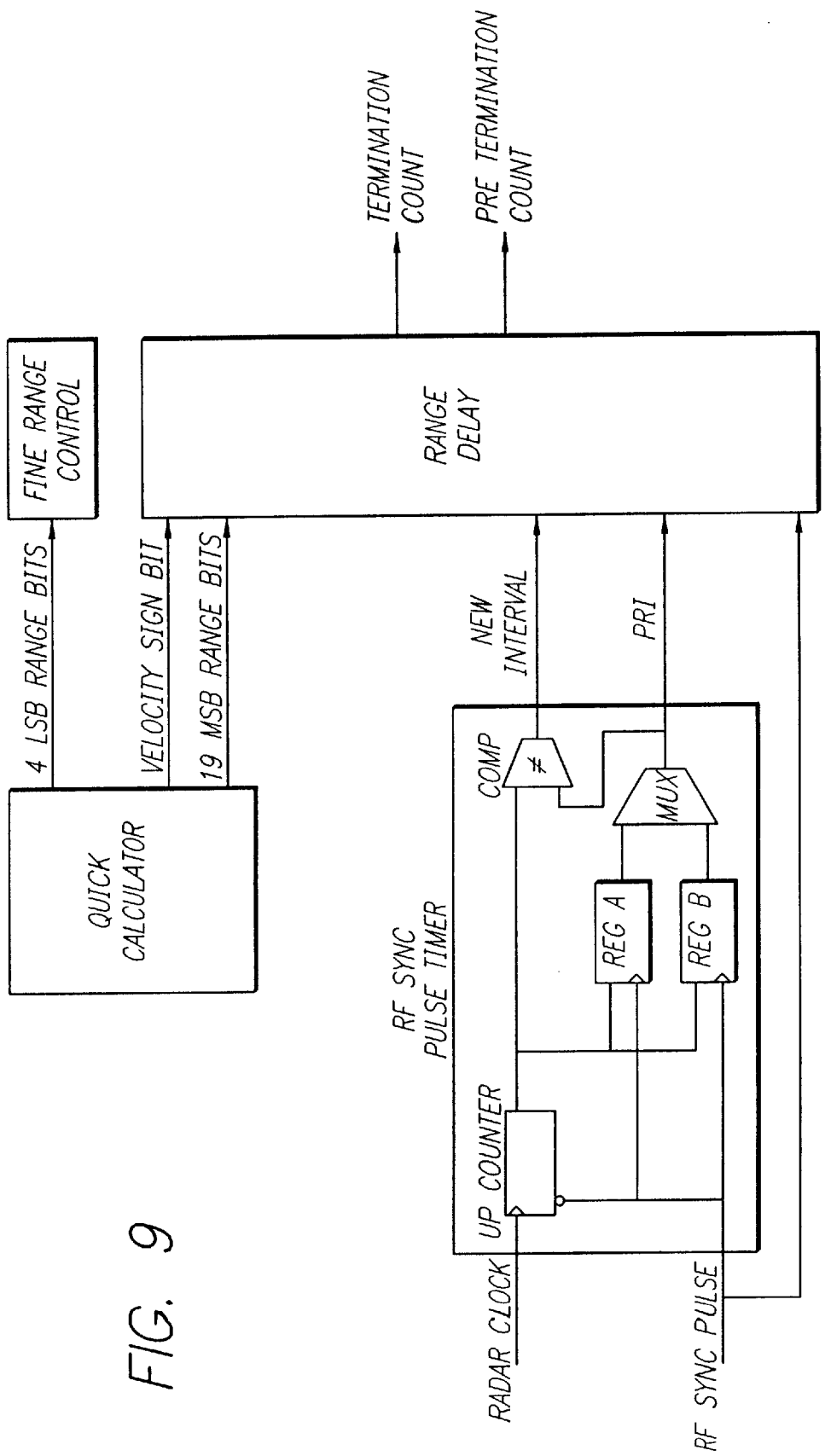
FIG. 9 is a block diagram of a portion of the functional block diagram of the range/doppler module, which shows an illustrative embodiment of the RF sync pulse timer circuit in more detail.

FIG. 9 is a block diagram of a portion of the functional block diagram of the range/doppler module, which shows an illustrative embodiment of the RF sync pulse timer circuit in more detail. As shown in FIG. 9, the RF sync pulse timer circuit 89 includes an up counter 91 which counts radar clock pulses when reset by the complement of an RF sync pulse signal. The count of the counter 91 is stored in A and B registers 93 and 95 and output via a multiplexer 97. Register B 95 is for use in a dual pulse repetition interval (PRI) mode. The output of the multiplexer 97 is compared to the output of the counter 91 by a comparator 99. As discussed more fully below, the multiplexer 97 outputs the radar PRI to the range delay circuit 90 and the comparator 99 outputs a 'new interval' signal to the range delay circuit 90.

Figure 10:
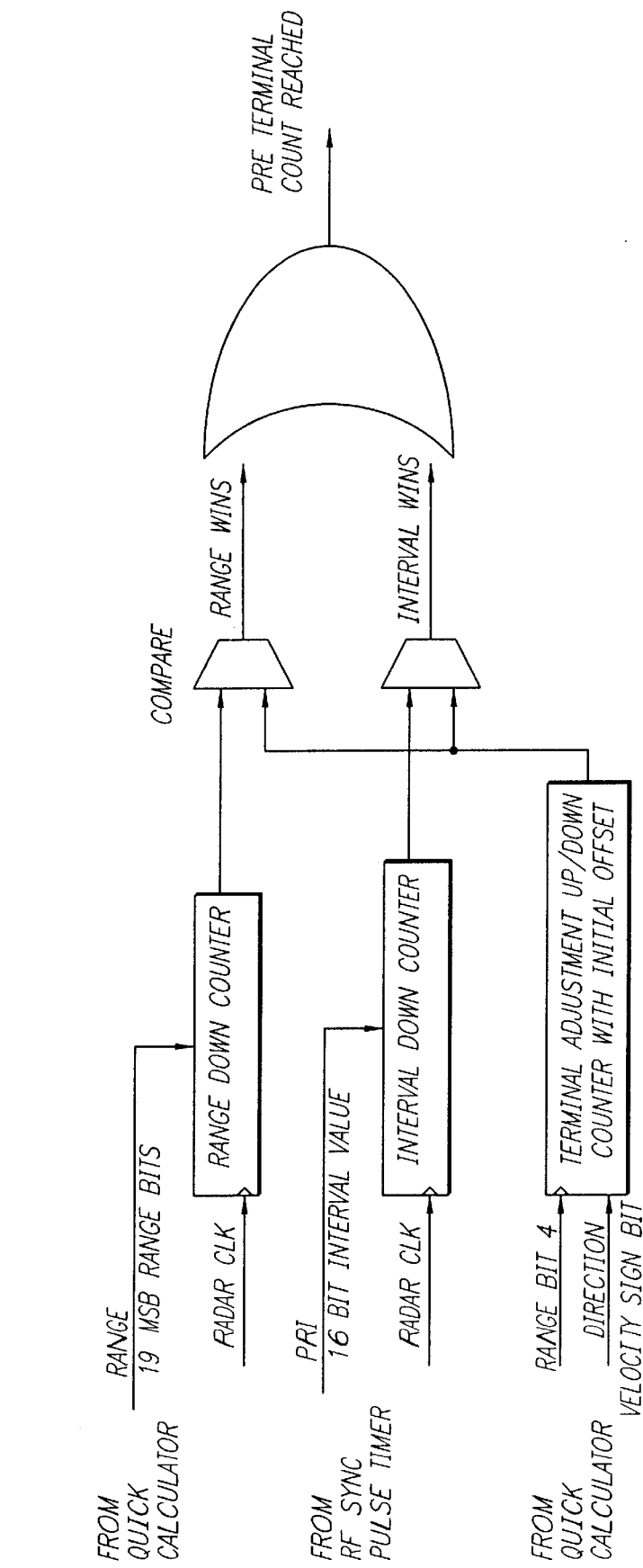
FIG. 10 is a block diagram of an illustrative embodiment of the range delay circuit utilized in the range/doppler module of the automated target generator system of the present invention.

FIG. 10 is a block diagram of an illustrative embodiment of the range delay circuit utilized in the range/doppler module of the automated target generator system of the present invention. The range delay circuit 90 includes a range down counter 126, an interval down counter 128 and a terminal adjustment up/down counter 130. As discussed below, the range and interval counts are compared to the output of the s terminal adjustment counter via first and second comparators 132 and 134, respectively. The outputs of the first and second comparators 132 and 134 are combined in an OR gate 136 to indicate preterminal count. In this block diagram the range value is the time (in radar clock cycles) that it would take for a radar pulse to travel from the antenna to the target and return to the antenna. The interval value is the time (in radar clock cycles) that each radar pulse follows the previous radar pulse. The terminal compare value both calibrates the terminal count, for hardware delays, and compensates the terminal count for range changes.

In the unambiguous case where the range is smaller than the interval between radar pulses then the time to reach a terminal count represents the actual range. In the ambiguous case where the target is further than the interval between radar pulses the terminal count represents how much time elapses before the next arriving radar pulse.

The fifth range bit (bit 4) represents the range resolution of one radar clock and, for closing range, will cause the terminal compare to count up. This will lower the time that the range or interval counter will need to reach a compare. If the terminal compare is thought of as zero then if the radar moves one radar clock cycle time closer to the target the compare will be at '1' instead of '0'. The count down range and interval counter take one less radar clock to reach '1'. The opposite logic applies to opening ranges.

Figure 11:
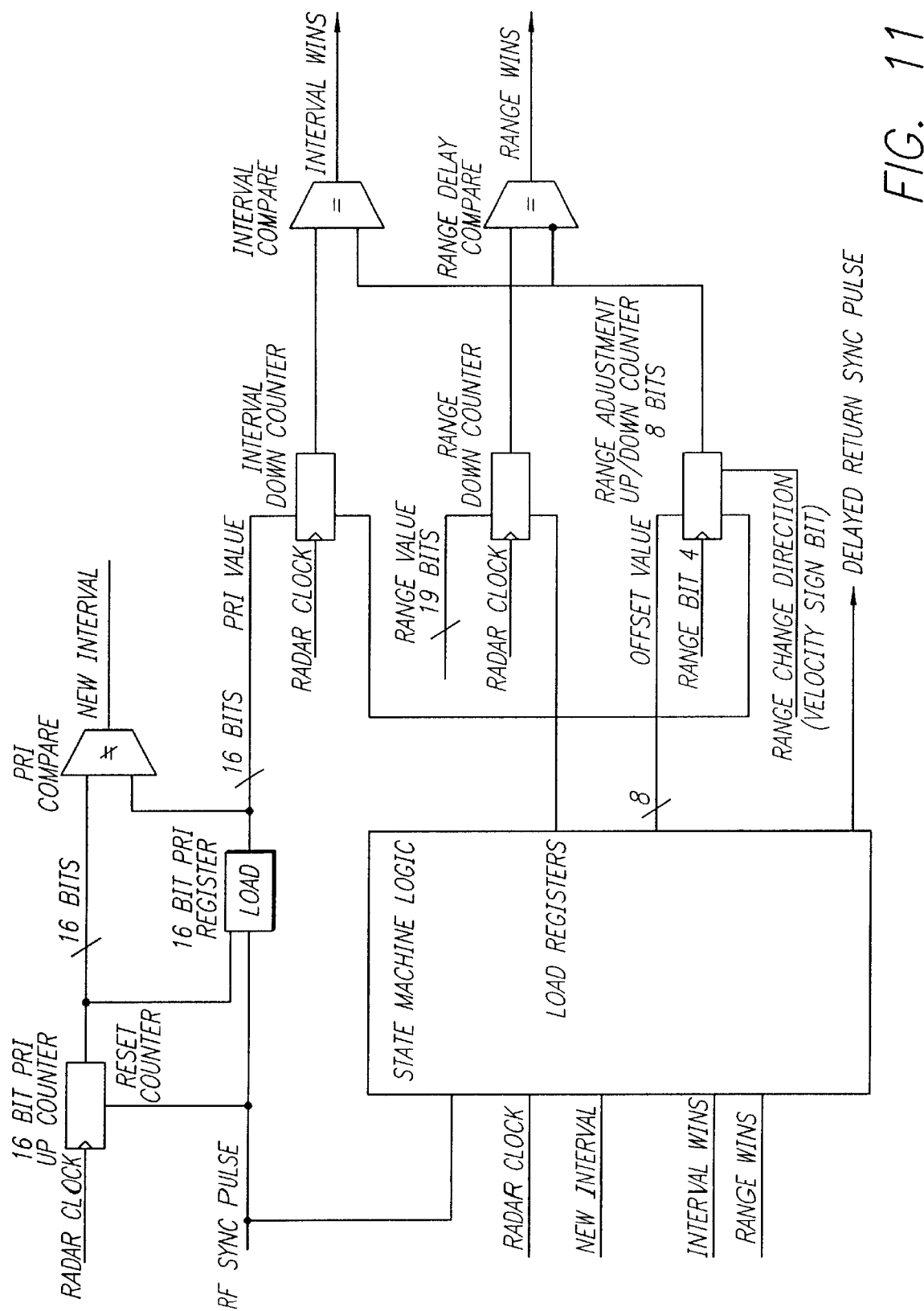
FIG. 11 is a diagram which shows an illustrative relationship between the RF sync pulse timer circuit and the range delay circuit with respect to a state machine utilized in the range/doppler module of the automated target generator system of the present invention.

FIG. 11 is a diagram which shows an illustrative relationship between the RF sync pulse timer circuit 89 and the range delay circuit 90 with respect to a state machine utilized in the range/doppler module of the automated target generator system of the present invention. The state machine 140 provides initial values and control signals for the range delay function. In the illustrative embodiment, the state machine 140 is implemented with registers and combinational logic in a field-programmable gate array (FPGA).

Figure 12:
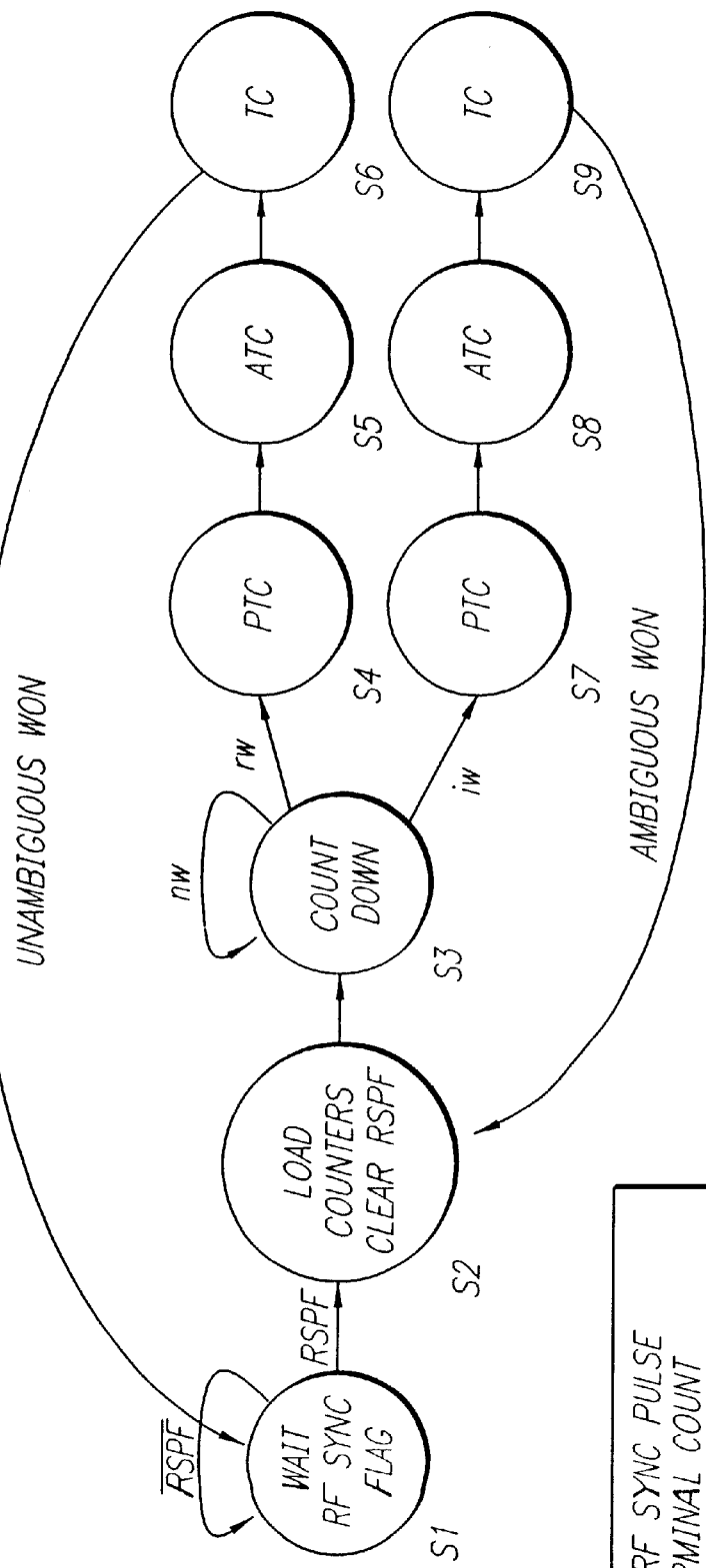
FIG. 12 is a state diagram illustrative of the operation of the state machine depicted in FIG. 11.

FIG. 12 is a state diagram illustrative of the operation of the state machine depicted in FIG. 11. The state machine is programmed in the hardware description language of VHDL in accordance with the state diagram of FIG. 12. In operation and With reference to FIGS. 11 and 12, the system is synchronized to the radar clock. The 16 bit PRI up counter 91 counts the number of radar clocks from one RF sync pulse to the next. The RF sync pulse signal is supplied by the radar and signals the leading edge of the transmitted RE. The 16 bit PRI registers 93, 95 store the output value of the 16 bit PRI up counter 91 which is then cleared to zero by the RF sync pulse. On the first RF sync pulse received and if the PRI changes values, then a compare of die counter and register values will not be equal. A 'not equal' signals the state machine 140 that a 'New Interval' has just begun. On receipt of the 'New Interval' signal, the state machine 140 resets and begins a new timing sequence. The first RF pulse sent to a target must be timed as unambiguous because no PRI value has been measured and therefore an initial range to the target must be measured. The range is loaded into the range down counter 126, and this counter begins counting down. When its output compares with the terminal adjustment up/down counter it is almost the time it would take for an RF signal to travel to a target and return.

The terminal adjustment up/down counter 130 is an 8 bit up/down counter that is necessary to calibrate the simulation hardware and to compensate for the fact that the radar may be moving relative to the target. Calibration of hardware is a constant and is loaded at each delayed return sync pulse. The simulation circuit takes time to perform the simulation and this time must be subtracted from the range/PRI calculations. A positive constant value loaded in the terminal adjustment counter will force the PRI compare and the range compare to occur before they reach zero. This constant can further be adjusted so that other simulation circuitry not discussed here can know ahead of time when it should begin simulating the returning RF.

The range adjust up/down counter adds one count or subtracts one count each time the radar travels closer or farther than the distance that RF would travel in one radar clock interval.

With reference to the state diagram of FIG. 12, at power up or whenever a New Interval signal is detected the state machine 140 will return to its reset state S1. In S1 the First Pulse Flag is set so that the first measurement will be range. The state machine will remain in State S1 until an RF Sync Pulse Flag is detected. The actual RF Sync Pulse is very small and could be missed so a flag is set which can be cleared later. In this way the system will never miss an RF Sync Pulse that is needed for synchronization of the interval and Range counters.

Once the RF Sync Pulse Flag is detected the second state S2 is entered. In S2 the Interval Down Counter 128 is loaded with the PRI 16 Bit Register Value, the Range Down Counter 126 is loaded with the actual range to the target value, and the Terminal Adjustment Up/Down Counter 130 is loaded with a constant as discussed on the previous page. Additionally the RF Sync Pulse Flag is cleared, enabling the flag to be set again on the next RF Sync Pulse. The state machine moves to state S3 on the next RF clock.

State S3 waits for either the interval compare or the range compare to occur. If the range compare occurs first, the state machine transitions to state S4. If the interval compare occurs first, the state machine transitions to state S7. An interval compare is prevented from occurring when the First Pulse Flag is set. States S4, S5, S6 and S7, S8, S9 trigger external hardware responsible for generating the delayed return sync pulse. If the First Pulse Flag was set then it will be cleared in S6.

State S6, which results from a range win, transitions back to state S1, to await a new RF sync pulse. State S9, which results from an interval win, transitions back to state S2, to immediately count off a new interval. The additional state delays after an interval or range compare occurs arc compensated for in the offset value loaded into the terminal adjustment counter.

Figure 13:
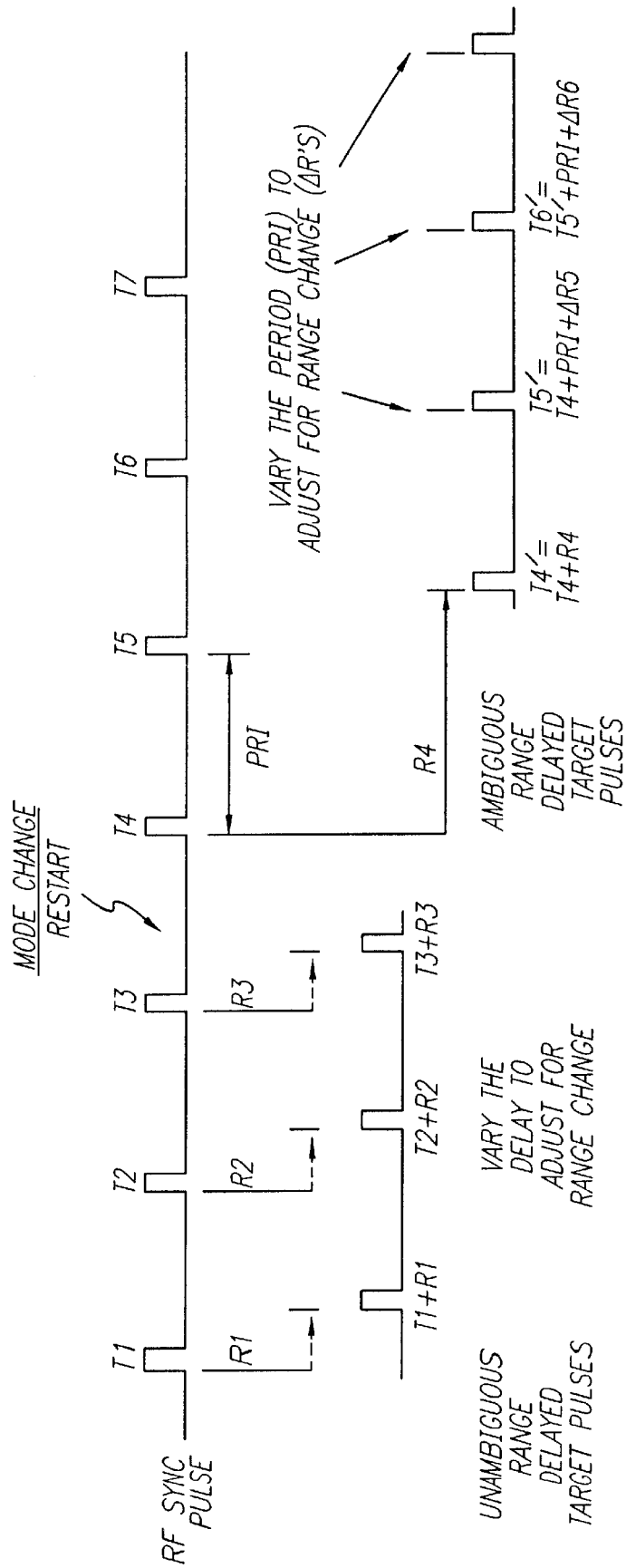
FIG. 13 is a timing diagram, which illustrates the range delay strategy implemented by the present invention.

FIG. 13 is a timing diagram, which illustrates die range delay strategy implemented by the present invention for both the unambiguous and ambiguous cases. In the unambiguous case, a delay (R1, R2, R3) is added to each received RF sync pulse to generate range-delayed target return pulses. The delay is varied to adjust for range changes. In the ambiguous case, an initial delay, R4, which represents target range is computed from the first RF sync pulse which occurs after a mode change. The first target return pulse is output after this initial delay. The times at which successive target return pulses are output are calculated by adding the current PRI to the time of the previous pulse plus or minus any range change (ΔR5, ΔR6, etc.). Returning to FIG. 5, the range delay circuit 90 outputs a terminal count (TC) and pre-terminal count (PTC) to a code generator 92. The code generator uses these signals to generate target delayed gate pulses of the appropriate timing and width along with any associated modulation.

Thus, the present invention has been described herein with reference to a particular embodiment for a particular application. Those having ordinary skill in the art and access to the present teachings will recognize additional modifications, applications and embodiments within the scope thereof For example, the teachings provided herein may be used for sonar as well as radar applications.

It is therefore intended by the appended claims to cover any and all such applications, modifications and embodiments within the scope of the present invention.

Accordingly,

What is claimed is:

1. An automated target simulator comprising:
 a first memory for receiving a plurality of initial values with respect to a simulated target and
 a circuit for generating current parameters with respect to said simulated target in response to said initial values, said circuit being a field-programmable gate array.

2. The invention of claim 1 wherein said first memory includes first, second, and third registers.

3. The invention of claim 2 wherein said initial values include range, velocity, and acceleration.

4. The invention of claim 3 wherein said first register stores said acceleration value.

5. The invention of claim 4 wherein said second register stores said velocity value.

6. The invention of claim 5 wherein said third register stores said range value.

7. The invention of claim 6 wherein said circuit is a field-programmable gate array.

8. The invention of claim 6 wherein said field-programmable gate array includes a first circuit responsive to said acceleration value stored in said first register for accumulating a term representing acceleration of said simulated target and providing an output with respect thereto.

9. The invention of claim 8 wherein said gate array further includes a second circuit responsive to said velocity value stored in said second register and said acceleration term for accumulating a term representing the velocity of said simulated target and providing an output with respect thereto.

10. The invention of claim 9 wherein said gate array includes a third circuit responsive to said range value stored in said third register and said velocity term for accumulating a term representing the range of said simulated target and providing an output with respect thereto.

11. The invention of claim 10 further including a fourth register for storing au acceleration correction value.

12. The invention of claim 10 wherein said first circuit is responsive to said acceleration correction value stored in said fourth register and accumulates said acceleration term in response hereto.

13. The invention of claim 10 wherein said first circuit accumulates acceleration for a given time period by adding an acceleration value from a previous time period to said acceleration correction value.

14. The invention of claim 10 wherein said second circuit accumulates velocity for a given time period by adding a velocity value for a previous time period to a product of acceleration for said previous time period and a period of time Δt.

15. The invention of claim 14 wherein said third circuit accumulates range for a given time period by adding a range value from a previous time period to a product of a velocity value from said previous time period and said period of time Δt.

16. The invention of claim 10 further including a first truncation correction circuit between said first circuit and said second circuit.

17. The invention of claim 16 further including a second truncation correction circuit between said second circuit and said third circuit.

18. An automated target simulator comprising:
 means for receiving an input signal representative of simulated range to a simulated target and
 a circuit for generating a simulated return from said simulated target, said circuit including means for determining whether a simulated pulse train to be received is ambiguous or unambiguous.

19. The invention of claim 18 wherein said circuit for generating a simulated return includes means for determining whether a simulated pulse train to be received is ambiguous or unambiguous.

20. The invention of claim 18 wherein said circuit for generating a simulated return includes means for adjusting the pulse repetition rate of said pulse train based on said determination.

21. The invention of claim 20 wherein said means for adjusting the pulse repetition rate includes means for compressing a pulse train.

22. The invention of claim 21 wherein said means for compressing a pulse train is a field-programmable gate array.

23. The invention of claim 18 wherein said circuit includes means for adjusting said simulated return for simulating movement relative to said simulated target.

24. An automated target simulator comprising:
 a first memory for receiving a plurality of initial values with respect to a simulated target;
 a first circuit for generating current parameters with respect to said simulated target in response to said initial values, said first circuit including a field-programmable gate array;
 means, responsive to said first circuit, for receiving an input signal representative of simulated range to a simulated target; and
 a second circuit for generating a simulated return from said simulated target.

* * * * *